INVENTORS E. R. ROBINSON
C. J. VOTAW
H. M. ZYDNEY
BY R C Lipton
ATTORNEY 3,427,589
Patented Feb. 11, 1969

3,427,589

ON-LINE DELIVERY OF DATA MESSAGES FROM A TRANSMITTER TO RECEIVERS ON THE SAME MULTISTATION LINE

Edgar R. Robinson, Middletown, Clarence J. Votaw, Elberon, and Herbert M. Zydney, Rumson, N.J., assignors to Bell Telephone Laboratories, Incorporated, Murray Hill, N.J., a corporation of New York Filed June 29, 1967, Ser. No. 649,947
U.S. Cl. 340—147 5 Claims
Int. Cl. H04q *11/20*

ABSTRACT OF THE DISCLOSURE

A master controller polls party line transmitters to determine whether they have data messages available, selects an available transmitter which sends the message heading, calls party line recorders designated in the heading and thereafter starts the transmitter to send the message text to the called recorders. Each recorder, when called, returns an acknowledgement which is noted by the master controller to provide assurance that the addressee stations receive the message.

*Field of invention*

This invention relates to multistation line data station selection systems and, more particularly, to control of on-line delivery of data messages from a party line transmitter to one or more party line receivers.

*Description of the prior art*

In data message distribution systems, a significant proportion of the data stations are transmitting and receiving for only a relatively small fraction of the available time. Since the data stations are idle most of the time, it is advantageous to connect groups of data stations to a common party or multistation line. To preclude contention between the data stations for the common line a master controller is utilized to control the delivery of the data messages.

In some party line systems, messages are distributed on-line, i.e., the message originates at one party line station and is destined for one or more of the other party line stations. One example of a data distribution system having on-line delivery involves a master controller which sequentially polls the data station transmitters to determine which stations have available messages. The controller can therefore selectively start a station having a message, eliminating contention between the several transmitters. The started station thereupon proceeds to send the message heading which contains appropriate call-in codes designating the destination stations. These call-in codes function to unblind the receivers at the destination stations to record the message text which is subsequently delivered to the line by the transmitting station.

In on-line delivery systems, it is important to provide assurance that the addressee station recorders are unblinded to record the message. This assurance can be provided by arranging the addressee station to return an answerback response when the call-in code is received. The sending station conventionally pauses after sending each call-in code to note the answerback response before sending the next call-in code. After all call-in codes are transmitted and the acknowledgement responses received, the sending station proceeds to transmit the message text. Special handling is provided when an addressee station fails to acknowledge a call-in code. All these provisions, however, require either attendant time at each sending station or complex and expensive control equipment, or both.

*Summary of the invention*

The object of this invention is to provide assurance that addressee stations are unblinded to receive on-line messages. At the same time the cost of manual attendance and complex control equipment is reduced by allocating the responsibility of assurance to the master controller, rather than to each transmitting station.

This invention contemplates a new master controller connected to party line stations, each arranged to advise the master controller whether a message is available in response to a station poll code, to send the message heading with the heading codes designating the stations of address in response to a transmitter selection code and to transmit the message text in response to a text initiation code. Each outlying station also provides answerback response when the recorder is selected by a call-in code and provides unblinding of the selected recorder to receive the subsequent message text.

It is a feature of this invention that, in addition to polling the party line stations for messages and selecting stations to send the message heading, the master controller detects the addressee station designations in the heading, generates and transmits the corresponding call-in codes and thereafter sends the text initiation code. By controlling the operation of the station transmitter and the call-in of the addressee stations, the master controller assumes functions previously provided by each line station.

It is another feature of this invention that the master controller detects each acknowledgement response and thereafter generates and transmits the call-in code of the next addressee station. In addition, the master controller notes any failure of a station to return an acknowledgement. Thus, assurance that a message from any party line station is delivered to other stations on the line is provided at the master station.

In accordance with the illustrative embodiment of this invention, the master controller lists in a memory the identity of each station designated in the heading of the message. After the message heading is received, the memory is scanned and when a listed station is reached, the corresponding call-in code is generated and transmitted. When the acknowledgement response is received, the station identity is eliminated from the list. Alternatively, a timer operates if the response is not received within a reasonable period of time, thus indicating the necessity of special handling. In any event, the list is modified until the store is completely scanned and all identities are eliminated whereupon the master controller sends the text initiation code to enable the party line transmitter to send the message text.

The foregoing and other objects and features of this invention will be fully understood from the following description of an illustrative embodiment taken in conjunction with the accompanying drawing.

*Brief description of the drawing*

The drawing comprises FIG. 1 and FIG. 2 which when arranged side by side disclose in schematic block form a multistation line data selection system wherein.

*Detailed description*

Figure 1:
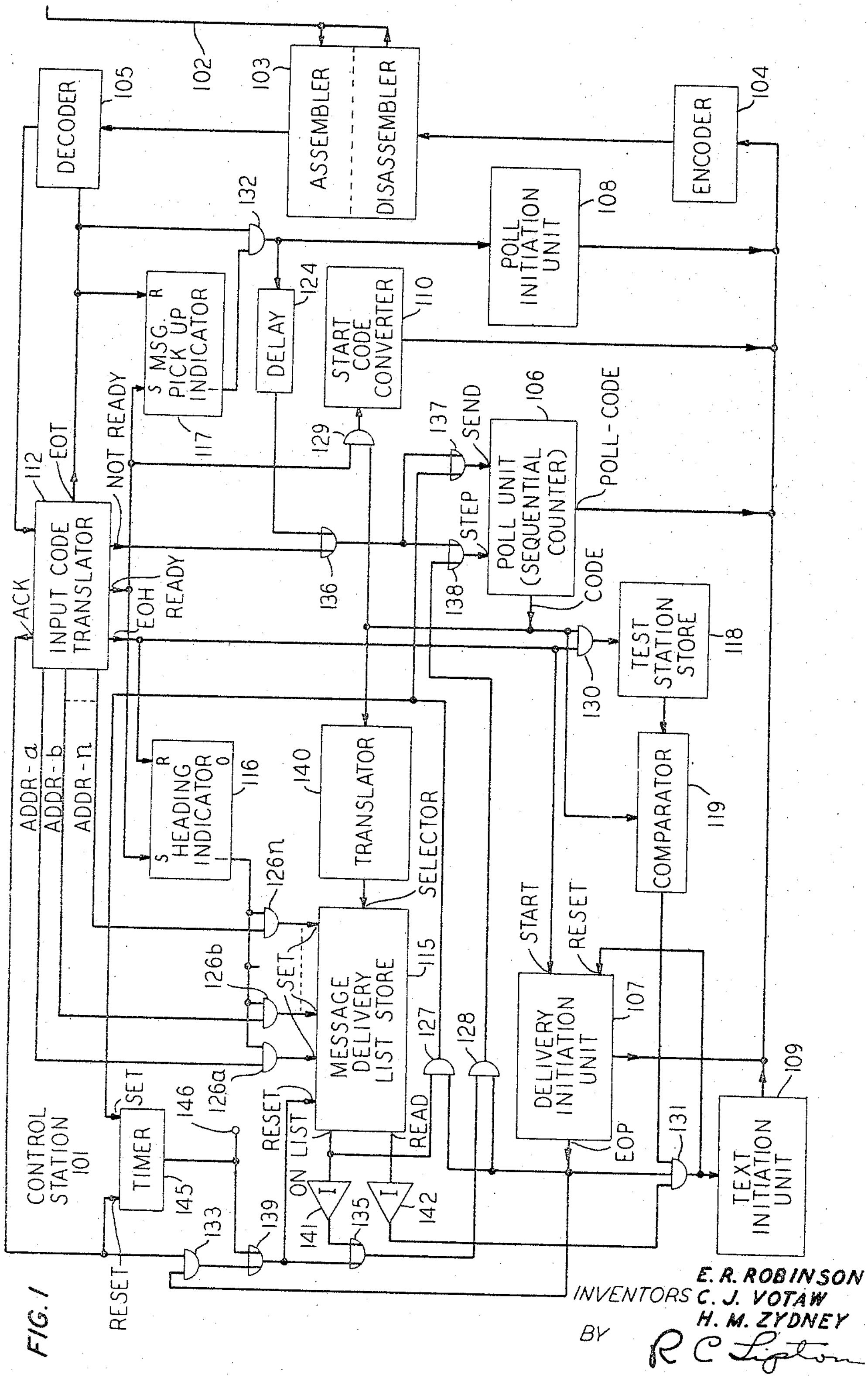
FIG. 1 shows a master controller for controlling delivery of on-line messages in accordance with this invention and FIG. 2 shows the party line data stations.

Referring now to the drawing, the master station is generally identified in FIG. 1 as control station 101. Extending from control station 101 is a data transmission line shown as line 102. In this disclosure the transmission line is shown as a single metallic lead and comprises a half duplex transmission path which alternatively conveys data from control station 101 and provides data to control station 101. Transmission line 102 may also comprise other forms of communication media, such as lead pairs and carrier facilities with appropriate employment of data sets. Transmission line 102 extends to a plurality of remote line stations, such as line station 201 and line station 202 shown in FIG. 2.

In general, control station 101 functions to control the delivery of messages from any one of the several remote line stations to any one or more of the other remote line stations. Control station 101 selectively polls each of the line stations to determine whether it has message traffic to send, starting the transmitter at the station which has a message available. When an outlying transmitter is started a list is made by control station 101 of all the stations of address, i.e., all the station addresses in the heading of the message, which addresses indicate the message destination. Control station 101 thereafter transmits the recorder selection code for each station of address on the list to select the receiver at the addressee station. Finally, control station 101 instructs the outlying transmitter to deliver the message text and unblinds all the selected recorders at the stations of address, permitting these stations to print the message text.

Considering now the sequential functions of control station 101, after the termination of the delivery of a message a message poll state is initiated. At this time control station 101 sends a poll initiation code sequence which functions to place the several outlying stations in the polling condition. After placing the outlying stations in the polling condition, control station 101 proceeds to send a station polling code to the next consecutive station, i.e., the next consecutive station with respect to the station previously polled. The remote station which is polled responds by sending an answer back, indicating whether a message is available in the station transmitter.

In the event that the outlying station responds that there is no message available, the station poll code of the next consecutive station is transmitted and the next station responds in the same manner as previously described. If, however, the outlying station responds that a message is available, control station 101 sends a start code sequence individual to the outlying station. The start code sequence operates to selectively start the transmitter at the polled outlying station. The started transmitter proceeds to send the message heading and all stations terminate the polling condition. The heading of the message is also received at control station 101 and each station address is listed in a store.

At the termination of the transmission of the message heading, the end-of-heading code sequence is transmitted by the outlying station and the transmitter thereat stops. The end-of-heading sequence is also recognized by control station 101, which sends a delivery preamble back to the outlying stations.

At the several outlying stations the delivery preamble is received, placing the several stations in the message delivery state. Control station 101 now sequentially examines all addresses on the address list and sends the call-in code of each station listed. It is noted that this call-in code may be the same as the station's poll code. The outlying station, however, being in the call-in or delivery state recognizes the poll code as the call-in code. The outlying station selected by the call-in code acknowledges the reception of a code by sending back an acknowledgement signal and selects the station recorder thereat for subsequent delivery of the message. At control station 101 the acknowledgement response from the outlying station is noted. Alternatively, failure to respond is noted. In either event the station address is eliminated from the list and the control station proceeds to examine subsequent addresses on the list.

Control station 101 continues to cycle through the address list until all of the addressee stations have been called in. With no stations remaining on the list, control station 101 transmits a text initiation code sequence which unblinds the selected outlying station printers and restarts the previously selected station transmitter. Accordingly, the outlying station transmitter sends the message text and the selected stations of address print the message text all under the control of control station 101. At the termination of this message delivery the end-of-transmission character is sent. The station transmitter stops when the outlying station recognizes the outgoing end-of-transmission character and the printers at the selected stations are blinded when the end-of-transmission character is received. At control station 101 the end-of-transmission character is detected and in response thereto the poll initiation code is transmitted to start a new polling sequence.

Poll unit 106 provides the generation of polling codes. Poll unit 106 comprises a conventional code generating unit having a plurality of sequential positions and when at each position presenting a corresponding polling code to output lead CODE. When energized by way of input lead STEP poll unit 106 advances to the next position to present the next polling code in the predetermined sequence to the output terminal conected to the CODE lead. These polling codes are also concurrently presented to the output terminal connected to lead POLL CODE and thence to encoder 104 when the input SEND lead is enabled or energized. It is noted that although lead CODE and lead POLL CODE are each shown as single output leads they may individually comprise a plurality of leads to convey the several elements of the output code in parallel. Accordingly, these output leads may be considered groups of parallel leads, each lead in the group arranged to convey an element of the data code.

Control station 101 is also provided with poll initiation unit 108 and text initiation unit 109. Poll initiation unit 108 and text initiation unit 109 are also code generators which, when enabled at their input, provide to their outputs and thence to encoder 104 the poll initiation code sequence and the text initiation code sequence, respectively. Start code converter 110 is also a code generator and arranged to provide at its output and thence to encoder 104 the several transmitter start codes for selectively starting outlying station transmitters. The input to start code converter 110 is provided by lead CODE extending through AND gate 129. Thus, start converter 110 converts the poll code provided by poll unit 106 when gate 129 is enabled and generates a corresponding transmitter start code.

Delivery initiation unit 107 is a code generator for applying to encoder 104 the delivery initiation code sequence when energized at input terminal START. Upon the termination of the generation of the delivery initiation code sequence, delivery initiation unit 107 provides an enabling condition to output terminal EOP. This enabling condition is maintained until a pulse is provided to delivery initiation unit 107 by way of its input terminal RESET.

Encoder 104 accepts data elements at its input and applies them to the disassembler portion of assembler/disassembler 103. The disassembler portion, in turn, shifts the code elements out serially to line 102. It is noted that the disassembler portion may be arranged to accept two or more data characters. The assembler portion of assembler/disassembler 103 accepts incoming character code elements serially from line 102 and applies them to decoder 105. Decoder 105, in turn, passes out the incoming code elements, a character at a time, to input code translator 112.

Input code translator 112 accepts data from decoder 105 and pulses its several output leads in accordance with the specific data code character applied thereto. For example, when the end-of-transmission code character is applied to input code translator 112, output lead EOT is pulsed. Similarly, when an outlying station responds with a data code indicating that a message is available or, alternatively, that no message is available, input code translator 112 pulses output leads READY or NOT READY. Similarly, when an outlying station acknowledges the reception of a recorder call-in code, which acknowledgement is by returning an appropriate code character, input code translator 112 pulses output lead ACK. The detection of the end-of-heading character by input code translator 112 results in the pulsing of output lead EOH. Finally, output leads TDDR–*a* through ADDR–*n* are individually pulsed in accordance with each address character detected by input code translator 112. Accordingly, an ADDR lead is provided individual to each outlying station recorder and the pulsing of that lead indicates the reception of the address code corresponding to that particular station.

The received address codes are listed by message delivery list store 115. Preferably, storage is provided by a plurality of memory cells, each cell individual to an outlying station recorder. A memory cell, in turn, may comprise a conventional flip-flop. The listing of an address, i.e., the setting of a memory cell, is provided by input terminal SET. Each lead to each input terminal SET corresponds to a station of address and the pulsing of the lead sets the memory cell individual to the outlying station.

The resetting of the memory cells is provided by input terminal RESET in accordance with the conditions of input lead SELECTOR, which preferably comprises a plurality of leads, one for each outlying recorder. Input lead SELECTOR extends to translator 140, which, in turn, is controlled by output lead CODE of poll unit 106. When a predetermined poll code is applied to translator 140 the translator, in turn, energizes a selected one of leads SELECTOR individually associated with the outlying station designated by the poll code. Now, when a pulse is provided to input terminal RESET the energized one of the SELECTOR leads directs the input pulse to the memory cell of the corresponding outlying station, resetting the cell. Output lead ON LIST of message delivery list store 115 is energized when a memory cell is selected by the SELECTOR leads and the memory cell is in the set condition. Output lead READ is energized so long as any one or more of the memory cells is in the set condition.

Control station 101 also includes heading indicator 116 and message pickup indicator 17. Indicators 116 and 117 comprise conventional flip-flops whose output terminal "1" goes high when set and goes low when reset.

Control station 101 also includes test station store 118 which can accept a code at the input thereof, store the code until the application of a new code, and apply the code elements to the output. These code elements are applied to comparator 119 which compares the stored code in store 118 with the polling code on the output lead CODE of poll unit 106, passing an enabling signal to gate 131 when these codes are identical.

Also included in control station 101 is delay unit 124 which provides a delay corresponding to the interval required to generate the poll initiation code sequence. A plurality of gates are also utilized in control station 101, such as AND gates **126*a* through 126*n* and AND gates 127 through 133. Control station 101 is also provided with OR gates 135 through 139, inverters 141 and 142 and timer 145**.

Figure 2:
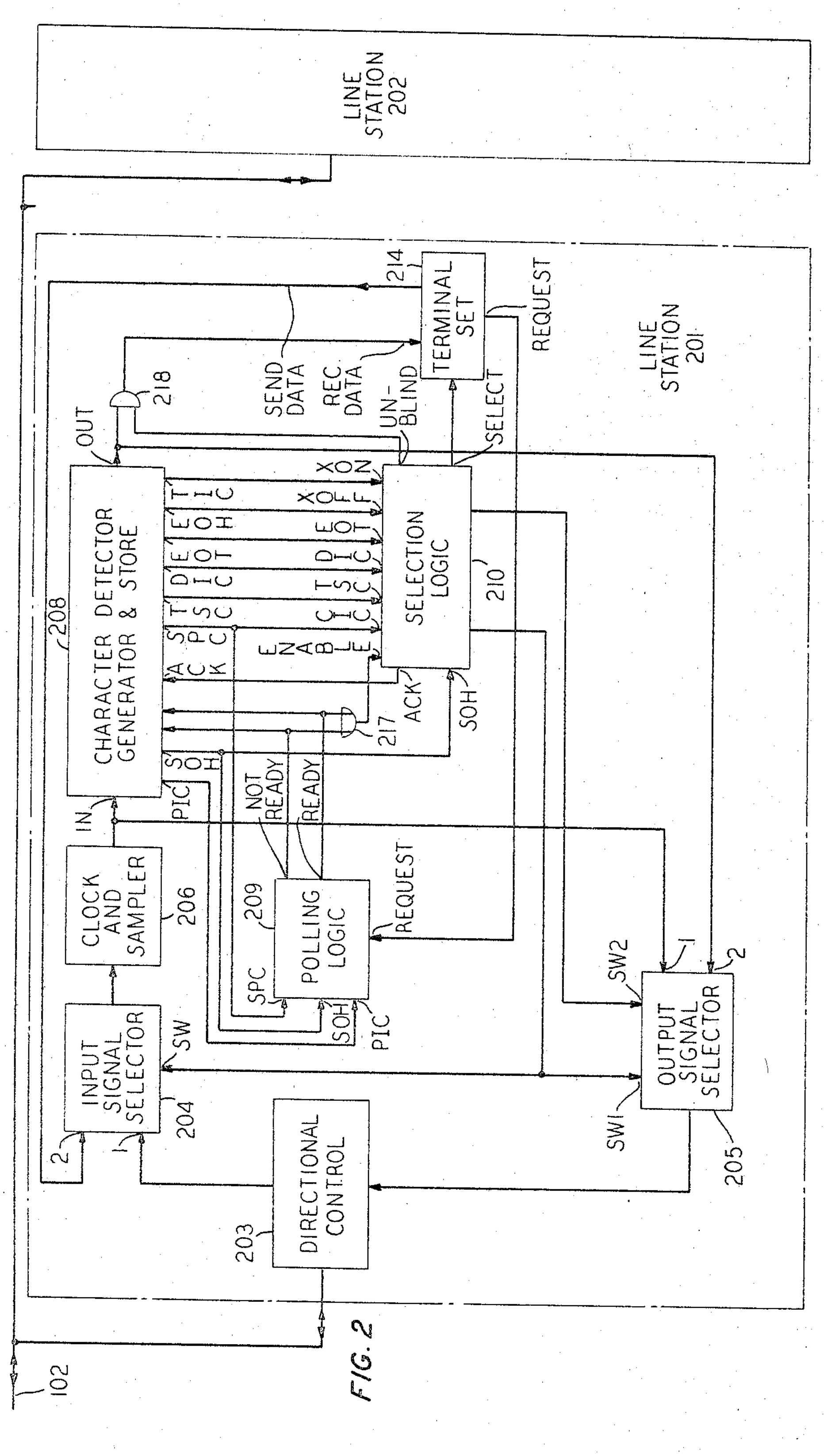

The several outlying stations, such as line station 201 and line station 202 in FIG. 2, are arranged in substantially the same manner. Each line station contains a terminal set, such as set 214 indicated in line station 201. This set includes a data source which applies data to output lead SEND DATA when input lead SELECT is energized. Set 214 also includes a data sink for accepting data from input lead RECEIVE DATA and recording or printing a record in accordance with the received data. In addition, set 214 includes various keys and lamps whereby an attendant may operate a particular key or keys to indicate that a message is available for transmission. With messge available, output lead REQUEST is energized.

Line station 201 also includes directional control 203. Directional control 203 functions to accept data from transmission line 102 and apply the data to input terminal "1" of input signal selector 204. Data provided to directional control 203 from the output of output signal selector 205 is passed to transmission line 102.

Input signal selector 204 normally passes data applied to input terminal "1" to clock and sampler 206. In the event, however, that input terminal SW is energized, input signal selector 204 accepts data from its input terminal "2" to apply to clock and sampler 206. Output signal selector 205 passes data to directional control 203 from input terminal "1" when input terminal SW1 is energized and, alternatively, applies data to directional control 203 from input terminal "2" when input terminal SW2 is energized.

Clock and sampler 206 accepts the data from input signal selector 204, retimes and samples the data and passes the sampled data to terminal "1" of output signal selector 205 and to input terminal IN of character detector generator and store 208.

Character detector generator and store 208 is arranged to accept serial data at terminal IN, temporarily store the data, and serially apply the stored data to terminal OUT. While the data is temporarily stored therein, character detector generator and store 208 applies energizing pulses to several output leads in accordance with the data stored therein. Specifically, character detector generator and store 208 pulses output lead PIC, output lead SPC and output lead SOH when the poll initiation code sequence, the station poll code individual to line station 201, and the start-of-heading code, respectively, are stored in character detector generator and store 208. Similarly, character detector generator and store 208 pulses output lead DIC, output lead TSC, output lead EOT, output lead EOH and output lead TIC when the delivery initiation code sequence, the start code individual to line station 201, the end-of-transmission code, the end-of-heading code and the text initiation code sequence, respectively, are stored therein. Finally, character detector generator and store 208 is arranged to generate code characters for application to terminal OUT when input leads ACK, NOT READY and READY are pulsed. Specifically, character detector generator and store 208 generates the character READY when input lead READY is pulsed, generates the character NOT READY when input lead NOT READY is pulsed and generates the acknowledgement code when input lead ACK is pulsed. Preferably, character detector generator and store 208 comprises a shift register having a sufficient number of stages for storing the elements of at least one data character together with input networks for coding the several stages with the elements of predetermined code characters when the above described input leads are pulsed and output networks for detecting predetermined code characters stored in the several stages, which output networks pulse the above described output leads.

Line station 201 also includes logic units, such as polling logic 209 and selection logic 210, which provide various output signals in response to various permutations of input signals. Considering first polling logic 209, when the logic unit is pulsed by way of lead PIC the unit goes to the poll condition state. In this state, if polling logic 209 is pulsed by way of input lead SPC, either output lead READY or output lead NOT READY is pulsed, in accordance with the condition of input lead REQUEST. Specifically, output lead READY is pulsed if input lead REQUEST is energized and output lead NOT READY is pulsed if input lead REQUEST is de-energized. Polling logic 209 is restored to its initial idle state when input lead SOH is pulsed.

Selection logic 210 goes to an enabled condition when input lead ENABLE is pulsed. When placed in this condition, selection logic 210 applies an energizing condition to input terminal SW2 of output signal selector 205 for an interval of time sufficient to send one code character through selector 205. With selection logic 210 in the enabled state, the reception of a pulse by way of input lead SOH restores logic 210 to the initial condition.

If selection logic 210 is in the enabled condition and input lead TSC is pulsed, selection logic 210 goes to the selected-to-send state. In this state, selection logic 210 energizes output lead SELECT and energizes input terminals SW and SW1 of signal selectors 204 and 205, respectively. In the selected-to-send state, selection logic 210 responds to a pulse on input lead XOFF by removing the application of the energizing condition to output lead SELECT and terminals SW and SW1 of selectors 204 and 205. The reception of a pulse on lead XON restores the energizing conditions to lead SELECT and terminals SW and SW1. Finally, selection logic 210 restores to the initial condition in response to a pulse on input lead EOT.

Selection logic 210 is placed in the delivery condition in response to the reception of a pulse from input terminal DIC. In the event that selection logic 210 receives a pulse by way of input terminal CIC when in the delivery condition, selection logic 210 goes to the selected-to-receive condition and energizes output lead ACK and, in addition, energizes input terminal SW2 of output signal selector 205 for an interval of time sufficient to send one data character. If a pulse is received on lead XON while selection logic 210 is in the selected-to-receive state, selection logic 210 energizes output lead UNBLIND and deenergizes input terminal SW2 of selector 205. In the event that selection logic 210 is still in the delivery condition, not being placed in the selected-to-receive state, the application of a pulse to input terminal XON restores selection logic 210 to its initial idle condition. In any event, the pulsing of input terminal EOT restores selection logic 210 to the initial idle condition.

Assume now that the system is in the message pickup state and that one of the outlying stations is sending the message text to one or more of the other outlying stations. In addition, the data characters of the message text are applied by way of line 102 to the assembler portion of assembler/disassembler 103 which, in turn, applies the elements of the data characters to decoder 105. Decoder 105, in turn, passes each data character to input code translator 112. Thus, input code translator 112 is monitoring the data message text, looking for the end-of-transmission character.

At the termination of the message the outlying station sends the end-of-transmission character, which restores the several stations to their idle conditions, as described hereinafter.

In addition, the end-of-transmission character is detected by input code translator 112, which applies a pulse to output lead EOT. During the message pickup state message pickup indicator 117 is SET, as described hereinafter, enabling gate 132. Accordingly, the pulse on output lead EOT is passed through gate 132 to poll initiation unit 108 and delay unit 124. In addition, the pulse on output lead EOT resets message pickup indicator 117. Accordingly, the detection of the end-of-transmission character by input code translator 112 resets message pickup indicator 117 and pulses poll initiation unit 108 and delay unit 124.

The application of an enabling pulse to poll initiation unit 108 results in the generation of the poll initiation code sequence, which code sequence is applied to the disassembler portion of assembler/disassembler 103 by way of encoder 104. The poll initiation code sequence is thereby passed to line 102 to initiate the polling condition of the several outlying stations, as described hereinafter.

The pulse applied to delay unit 124 is passed therethrough after a delay corresponding to the interval required to generate and transmit the poll initiation code sequence. Accordingly, after the sequence has been transmitted, delay unit 124 pulses OR gate 136, pulsing, in turn, OR gates 137 and 138.

The pulsing of OR gate 138 provides energization of input lead STEP of poll unit 106. Accordingly, poll unit 106 steps to the position corresponding to the next sequential outlying station after the position corresponding to the outlying station which just delivered the message. The pulsing of OR gate 137 energizes input lead SEND of poll unit 106, thereby applying the poll code of this next sequential station to output terminal POLL CODE. Accordingly, the station polling code character individual to the next outlying station is passed by way of encoder 104 and assembler/disassembler 103 to transmission line 102.

At each outlying station, such as line station 201, the incoming data is passed from line 102 through directional control 203 to input terminal "1" of input signal selector 204. As previously described, input signal selector 204 normally applies data from input terminal "1" to the output thereof and then to clock and sampler 206. The sampled data is thus passed to character detector generator and store 208. When the poll initiation code sequence is recognized by store 208, output lead PIC is pulsed. This pulse is passed to polling logic 209, placing it in the poll condition state.

The next character received by line station 201 is the station poll code which is passed through directional control 203, input signal selector 204 and clock and sampler 206 to character detector generator and store 208. If the station poll code is individual to station 201, store 208 pulses output lead SPC, thereby pulsing, in turn, polling logic 209. Accordingly, polling logic 209 pulses output lead READY or output lead NOT READY in accordance with the condition of input lead REQUEST.

If a message is available in terminal set 214, output lead REQUEST is energized and polling logic 209 pulses output lead READY. This pulse is passed to input lead READY of character detector generator and store 208 and through OR gate 217 to input lead ENABLE of selection logic 210. Selection logic 210 goes to the enabled condition and momentarily energizes input terminal SW2 of selector 205. The READY polling response of line station 201 is, therefore, coded in store 208 and passed to output lead OUT and then through output signal selector 205 to directional control 203 to transmission line 102. Alternatively, if a message is not available in terminal set 214, output lead REQUEST is de-energized, whereby polling logic 209 pulses output lead NOT READY. This codes character detector generator and store 208 with the "not ready" data character response and enables selection logic 210 via OR gate 217. The "not ready" data character response is, therefore, similarly passed through output lead OUT of store 208 and then through output signal selector 205 and directional control 203 to transmission line 102.

Returning now to control station 101, the data character response to the polling is passed by way of assembler/disassembler 103 and decoder 105 to input code translator 112. If the outlying station did not have a message available the not ready data character response is recognized by input code translator 112 which pulses output lead NOT READY. Lead NOT READY extends to OR gate 136 and the pulse passed therethrough pulses OR gates 137 and 138. The pulsing of OR gates 137 and 138 steps poll unit 106 to the next sequential position and operates poll unit 106 to apply the poll code of the next station to output lead POLL CODE, as previously described. Accordingly, the poll code of the next outlying station is delivered to transmission line 102. The polling response of the next station then proceeds in the same manner as described for the previous station.

If the outlying station had a message available and responded with the ready code character, input code translator 112 pulses output lead READY. This passes a pulse to the SET input of heading indicator 116 and the SET input of message pickup indicator 117 whereby both the indicators are operated to the SET condition. In addition, AND gate 129 is enabled and in the enabled state passes the poll code that is coded on output lead CODE of poll unit 106 to start code converter 110. Accordingly, start code converter 110 converts the poll code to the transmitter start code of the outlying station identified by the poll code and this transmitter start code is passed through encoder 104 and assembler/disassembler 103 to transmission line 102. Accordingly, with a station responding that a message is available, heading indicator 116 and message pickup indicator 117 are set and the transmitter start code individual to the station is transmitted over line 102.

At the outlying station having the available message, the reception of the transmitter start code of the station by character detector generator and store 208 results in the pulsing of output lead TSC. This pulses input lead TSC of selection logic 210, placing it in the selected-to-send state. Accordingly, selection logic 210 energizes output lead SELECT and input terminals SW and SW1 of selectors 204 and 205. The energization of output lead SELECT enables the data source to initiate transmission of the message it has available. Accordingly, the message heading is first transmitted, being passed to output lead SEND DATA and then to input terminal "2" of input signal selector 204. Since input terminal SW is energized the heading is passed through to clock and sampler 206 and then in parallel to character detector generator and store 208 and input terminal "1" of output signal selector 205. With input terminal SW1 energized, output signal selector 205 passes the data to directional control 203 and then to line 102.

The start-of-heading character is the first character in the heading. This character is detected by character detector generator and store 208 pulsing lead SOH. The pulse is passed to polling logic 209, restoring it to its initial condition. At the same time, the stores at other outlying stations corresponding to character detector generator and store 208 detect the start-of-heading character, thereby restoring the polling logic units at these stations to the initial condition. In addition, input lead SOH of selection logic 210 is pulsed at other stations, restoring the logic unit to the initial condition. Accordingly, at the transmitting station selection logic 210 is in the selected-to-send state while at all other stations the selection logic unit restores to the initial condition.

The outlying transmitting station continues to send the message heading, including each of the addresses, and at the conclusion of the heading the end-of-heading character is transmitted. This is detected by character detector generator and store 208 whereby output lead EOH is pulsed. The pulse is passed to input terminal XOFF of selection logic 210, thus removing the energization of output lead SELECT, and input terminals SW and SW1 of signal selectors 204 and 205. This stops the data source in terminal set 214 and reconnects character detector generator and store 208 to transmission line 102 by way of directional control 203, input signal selector 204 and clock and sampler 206. The line station thus sends the message heading and stops until it receives instructions from control station 101 to deliver the message text.

At control station 101 the address heading is monitored by input code translator 112. As each address code is received, a corresponding one of output leads ADDR–*a* through ADDR–*n* is pulsed. Leads ADDR–*a* through ADDR–*n* extend to AND gates **126*a* through 126*n*. As previously described, heading indicator 116 is set when the selected outlying transmitting station responded that a message is available. With heading indicator 116 set, its output terminal "1" goes high, thereby enabling gates 126*a* through 126*n*. Accordingly, with gates 126*a* through 126*n*** enabled, the pulsing of any one of output leads ADDR–*a* through ADDR–*n* by input code translator 112 results in the application of a pulse to a corresponding one of the set input terminals to message delivery list store 115. Accordingly, when an address code is received the input SET lead of message delivery list store 115 corresponding to the line station designated by the address code is pulsed and the associated memory cell in message delivery list store 115 is set. Thus, the several memory cells designated by the addresses in the message heading are placed in the set condition in response to the reception of the address codes. It is noted that with one or more of the memory cells set, output lead READ goes to the high condition, applying a low condition by way of inverter 142 to gate 131. Therefore, gate 131 is disabled so long as a memory cell is set in message delivery list store 115.

At the conclusion of the message heading, the end-of-heading character is transmitted by the outlying station and received by input code translator 112. Input code translator 112, in turn, pulses output lead EOH. This pulse is passed to the RESET input of heading indicator 116, restoring the indicator to the reset condition. In addition, the pulse on output lead EOH of input code translator 112 is passed to transfer gate 130 and the input terminal START of delivery initiation unit 107. The enabling of gate 130 passes the poll code on output lead CODE of poll unit 106 to test station store 118. Test station store 118, therefore, stores the poll code of the outlying station corresponding to the present position of poll unit 106. The application of the pulse to input terminal START of delivery initiation unit 107 starts the generation of the delivery initiation code sequence. This code sequence is thereby passed to encoder 104 and then by way of assembler/disassembler 103 to transmission line 102. At the conclusion of the generation of the delivery initiation code sequence, output lead EOP is energized, thereby enabling gates 127, 128, 131 and 133.

With gates 127 and 128 enabled, output lead ON LIST of message delivery list store 115 is examined. It is noted that lead ON LIST extends to AND gate 127 and is also connected through inverter 141 and OR gate 135 to AND gate 128. As previously recalled, output lead ON LIST is energized in the event that input lead SELECTOR designates an outlying station and the memory cell in message delivery store 115 associated with the outlying station is in the set condition. At this time the position of poll unit 106 corresponds to the outlying station transmitting the message. Translator 140 responds to the poll code at output lead CODE of poll unit 106 to energize the selector leads to designate the transmitting station. Since the transmitting station does not address its message to itself, its memory cell is not set and lead ON LIST is not energized. Accordingly, AND gate 128 is enabled by way of inverter 141 and OR gate 135. This enabling condition is passed to OR gate 138 and then to input lead STEP of poll unit 106. Poll unit 106 thus steps to the next position.

If the outlying station corresponding to the next position is not an addressee station, lead ON LIST remains de-energized. This maintains input lead STEP of poll unit 106 energized, permitting the poll unit to proceed to the next position. If the next position of poll unit 106 corresponds to an addressee station, however, lead ON LIST is energized, thereby applying an energizing signal through AND gate 127 and OR gate 137 to input lead SEND of poll unit 106. Accordingly, the poll code of the outlying station is delivered to line 102. The output pulse of AND gate 127 is also applied to the input SET lead of timer 145. This initiates the timing operation of timer 145 which is arranged to time out after an interval which is of sufficient duration to extend beyond the subsequent response of the outlying station to the poll code.

As described hereinafter, the outlying addressee station is in the delivery state and recognizes its poll code as the call-in code. The outlying addressee station is selected and returns an acknowledgement response.

At control station 101 the acknowledgement response is detected by input code translator 112 which pulses output lead ACK. This pulse resets timer 145 and, in addition, is passed through AND gate 133 and OR gate 139 to OR gate 135 and to the input lead RESET of message delivery list store 115.

If the outlying station fails to return the acknowledgement response, timer 145 is not reset and times out, passing a pulse to terminal 146 and to OR gate 139. Thus, OR gate 135 and input lead RESET of store 115 are pulsed as though the station responded. The pulse on terminal 146 indicates, however, the failure to respond. This pulse may be utilized by raising an alarm and identifying the outlying station by reading input leads SELECTOR of store 115. With the failure noted and the station identified, various well known actions, such as message intercept, can be instituted by the attendant at control station 101.

Returning now to the pulsing of input lead RESET of message delivery list store 115, with the SELECTOR leads designating the responding outlying station, results in the resetting of the memory cell individual to the station. The pulsing of OR gate 135 passes a pulse through AND gate 128 and OR gate 138 to the input lead STEP of poll unit 106. Accordingly, in response to the acknowledgement by the outlying station, its memory cell in message delivery list store 115 is reset and poll unit 106 is stepped to the next consecutive position.

In this manner each memory cell in message delivery list store 115 is examined and in the event the memory cell is set the call-in code of the corresponding station is transmitted to line 102. This procedure is repeated until poll unit 106 cycles through all positions and returns to the initial position. At this time, with all of the memory cells examined and thus none in the set state, output lead READ of message delivery list store 115 is de-energized whereby inverter 142 applies an enabling potential to AND gate 131. At the same time, output lead EOP of delivery initiation unit 107 is applying an enabling potential to AND gate 131. In addition, with poll unit 106 back to its initial position, the poll code applied to output lead CODE corresponds to the poll code in test station store 118. These codes are compared by comparator 119 and, since they check, comparator 119 applies an enabling potential to gate 131.

Since all of the input leads to gate 131 are enabled, an energizing signal is passed to the input lead RESET of delivery initiation unit 107 and passed to text initiation unit 109. Accordingly, delivery initiation unit 107 is restored to its initial condition, removing the energizing condition on lead EOP. This disables gates 127, 128, 131 and 133. In addition text initiation unit 109 is operated to generate the text initiation code sequence. This code sequence is passed to line 102, whereby, as described hereinafter, the outlying transmitting station is started and the message text is delivered. In addition, the outlying addressee station recorders are unblinded and the message is printed at these addressee stations.

At the conclusion of the message the outlying transmitting station sends the end-of-transmission code character. This character is monitored by input code translator 112 and output lead EOT is pulsed. The pulse on output lead EOT is passed through AND gate 132 and to the RESET input of message pickup indicator 117. Thus, indicator 117 is reset, poll initiation unit 108 is operated and a pulse is passed through delay unit 124 whereby, as previously described, a new poll state is initiated. The outlying stations are thus again polled for new message material.

It is recalled that at the outlying transmitting station the message heading has been transmitted and the data source has stopped. At all other outlying stations the polling logic unit therein corresponding to polling logic unit 209 has been restored to its initial condition. When control station 101 has listed all the address codes and received the end-of-heading character it proceeds to send out the delivery initiation code sequence, followed by the call-in codes of the addressee stations.

When an outlying station receives the delivery initiation code sequence and it is passed to character detector generator and store 208, output lead DIC is pulsed. This pulse is passed to a selection logic 210, placing it in the delivery state.

Assuming now that when selection logic 210 is in the delivery state the call-in code individual to the outlying station is received, character detector generator and store 208 pulses output lead SPC. This pulse is passed to input lead CIC of selection logic 210, transferring the logic unit to the selected-to-receive condition. In this condition selection selection logic 210 pulses output lead ACK and energizes input terminal SW2 of output signal selector 205 for an interval of time sufficient to send a data character. The pulsing of output lead ACK codes character detector generator and store 208 with the acknowledgment response character and, with input terminal SW2 of selector 205 momentarily energized, the character is passed from the output lead of store 208 through selector 205 and directional control 203 to transmission line 102. Accordingly, while in the delivery state, the line station responds to the station poll code by recognizing it as a call-in code and responding with an acknowledgement character.

After transmitting the address codes for all stations, control station 101 sends the text initiation code sequence to the outlying transmitting station and character detector generator and store 208 pulses output lead TIC in response to the text initiation code sequence. This applies a pulse to input lead XON of selection logic 210. Accordingly, selection logic 210 at the transmitting station energizes input terminals SW and SW1 of selectors 204 and 205 and applies an energizing potential to lead SELECT. This restarts the data source, which proceeds to send the message text to transmission line 102 in the same manner as previously described.

At the addressee stations, character detector generator and store 208 pulses output lead TIC in response to the reception of the text initiation code sequence. In this case, with selection logic 210 in the selected-to-receive condition, the pulsing of input lead XON results in the energizing of output lead UNBLIND. The energizing of output lead UNBLIND enables gate 218. At this time the outlying transmitting station proceeds to send the message text. This is received by the addressee line station by way of directional control 203, input signal selector 204, clock and sampler 206 and character detector generator and store 208. The data is then passed to output lead OUT of store 208 through AND gate 218 to input lead RECEIVE DATA of terminal set 214. Accordingly, the message text is printed by the data sink in terminal set 214 at the addressee station.

At the unselected outlying stations the text initiation code sequence is recognized by character detector generator and store 208, pulsing output lead TIC. The resultant pulse applied to input lead XON of selection logic 210 restores the logic unit to its initial condition. This restores the unselected outlying station to its initial idle condition.

At the end of the transmission of the message text, the transmitting station sends the end-of-transmission character. At the transmitting station character detector generator and store 208 monitors the text and pulses output lead EOT. This is passed to input lead EOT of selection logic 210, restoring selection logic 210 to the initial idle condition. With selection logic 210 restored, the data source in terminal set 214 stops and the transmitting station is returned to its initial condition. Similarly, at the addressee station or stations, character detector generator and store 208 recognizes the end-of-transmission character and selection logic 210 is returned to its initial condition. This restores the addressee stations to their initial idle condition. All outlying stations are now prepared for the new poll state which is initiated at this time by control station 101.

Although a specific embodiment of this invention has been shown and described, it will be understood that various modifications may be made without departing from the spirit of this invention.

What is claimed is:

1. In a multistation line selection system, a plurality of stations having transmitters for sending data messages to said line and having receivers for receiving messages from said line, said data messages having a heading portion designating addressee stations followed by a text portion, means at each station for enabling the transmitter thereat to send the heading portion when a message is available, means for operating said enabled transmitter to send the following text portion in response to the reception of a start code, and further means at each station for enabling the receiver thereat in response to the reception of a call-in code individual thereto, *characterized in that* said system is provided with a master controller which includes means for examining the heading portion transmitted by the enabled transmitter, means for transmitting a call-in code individual to each station designated in said examined heading portion and means operated after the call-in codes are transmitted for sending the start code whereby all stations of address receive the text portion from the line.

2. In a multistation line selection system in accordance with claim 1 wherein said further means at each station includes means for sending an acknowledgement signal in response to the reception of said individual call-in code, and said master controller includes means for detecting said acknowledgement signal, said detecting means operable in response to said acknowledgement signals for operating said call-in code transmitting means to send the next call-in code.

3. In a multistation line selection system in accordance with claim 2 wherein said master controller further includes timing means operable in response to the failure of said detecting means receiving an acknowledgement signal after a call-in code in transmitted.

4. In a multistation line selection system in accordance with claim 1 wherein said examining means includes means for listing each addressee station designated by said heading portion and said call-in code transmitting means includes means responsive to each one of said listed addressee station designations for transmitting a corresponding call-in code.

5. In a multistation line selection system wherein a master controller includes means for transmitting poll codes to said line to determine whether party line transmitters have messages available, means for transmitting selection codes to said line for selectively enabling any party line transmitter having a data message available to designate party line station destinations, means for transmitting call-in codes to said line for selectively enabling party line recorders to receive data from said line and means for transmitting an initiating code for starting said enabled party line transmitter to send the available data message, *characterized in that* said master controller further includes means for detecting and listing said party line station destinations designated by said enabled transmitter, means controlled by said listed station destinations for applying corresponding call-in codes to said call-in code transmitting means, and means enabled after said controlled means applies all of the call-in codes corresponding to listed station destinations for operating said initiation code transmitting means.

References Cited

UNITED STATES PATENTS

| | | | |
|---|---|---|---|
| 2,871,286 | 1/1959 | Bacon et al. | 178—2 |
| 2,912,485 | 11/1959 | Kaufman et al. | 178—4.1 |

EUGENE G. BOTZ, *Primary Examiner.*

U.S. Cl. X.R.

340—163; 178—4.1